United States Patent [19]
Rogers

[11] Patent Number: 4,752,080
[45] Date of Patent: Jun. 21, 1988

[54] HEAVY DUTY TRAILER HAVING STEERABLE GROUND WHEELS

[76] Inventor: Roy K. Rogers, 26575 Barns, Roseville, Mich. 48066

[21] Appl. No.: 946,549

[22] Filed: Dec. 24, 1986

[51] Int. Cl.⁴ .............................................. B62D 13/02
[52] U.S. Cl. ................................. 280/426; 280/81 A; 280/442
[58] Field of Search ........... 280/419, 426, 442, 446 R, 280/423 R, 400, 81 A, 89; 172/282

[56] References Cited

U.S. PATENT DOCUMENTS

| | | | |
|---|---|---|---|
| 2,741,489 | 4/1956 | Bigge | 280/426 |
| 2,793,052 | 5/1957 | Googe | 280/426 |
| 3,689,107 | 9/1972 | Hunes | 280/426 |
| 4,244,596 | 1/1981 | Chung | 280/426 |
| 4,441,730 | 4/1984 | Damm | 280/426 |
| 4,644,844 | 2/1987 | Zierler | 280/426 |

FOREIGN PATENT DOCUMENTS

| | | | |
|---|---|---|---|
| 2147328 | 3/1973 | Fed. Rep. of Germany | 280/442 |
| 2200739 | 7/1973 | Fed. Rep. of Germany | 280/426 |
| 2312565 | 9/1974 | Fed. Rep. of Germany | 280/426 |
| 1543236 | 10/1968 | France | 280/81 A |
| 482134 | 3/1938 | United Kingdom | 280/442 |

Primary Examiner—John J. Love
Assistant Examiner—Everett G. Diederiks, Jr.
Attorney, Agent, or Firm—Peter A. Taucher; David L. Kuhn

[57] ABSTRACT

A pre-existing trailer is modified to increase its payload capacity from approximately 50 tons to approximately 60 tons. Modifications involve the addition of one new axle, and the remounting of existing wheels to make them steerable. The modified trailer has one fixed axis axle and four steerable axles (two in front of the fixed axis axle, and two behind the fixed axis axle). During turning maneuvers the ground wheels on the fixed axis axle turn freely without skidding because the other steerable wheels automatically turn into the direction of steer. The modified trailer operates with lessened skid force on the wheels, with resultant increases in tire life and axle life.

13 Claims, 5 Drawing Sheets

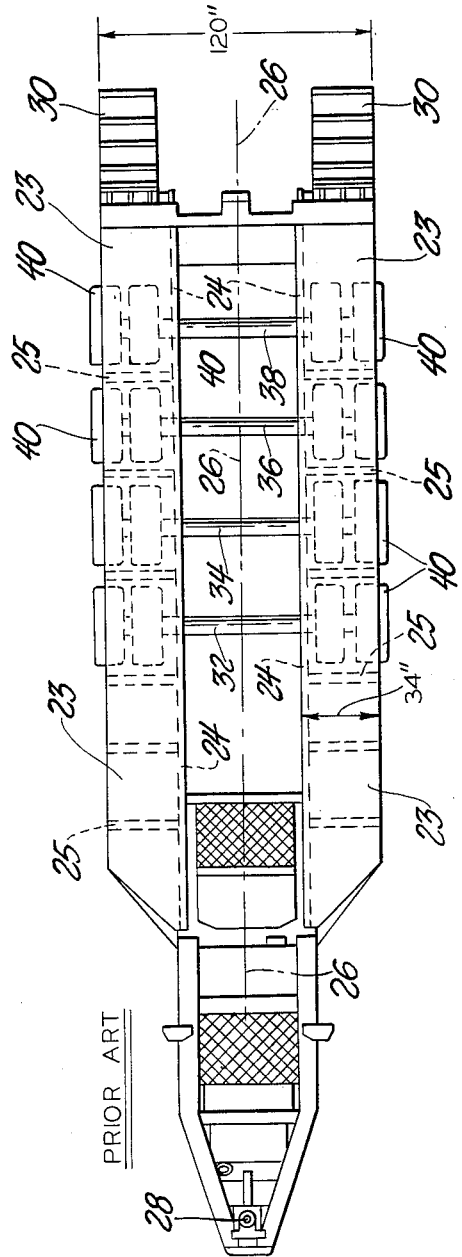
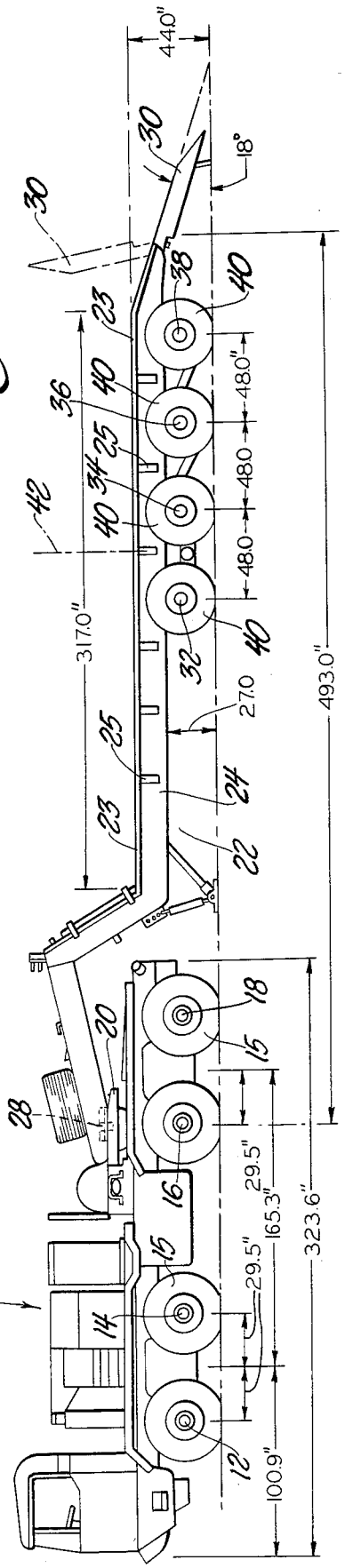

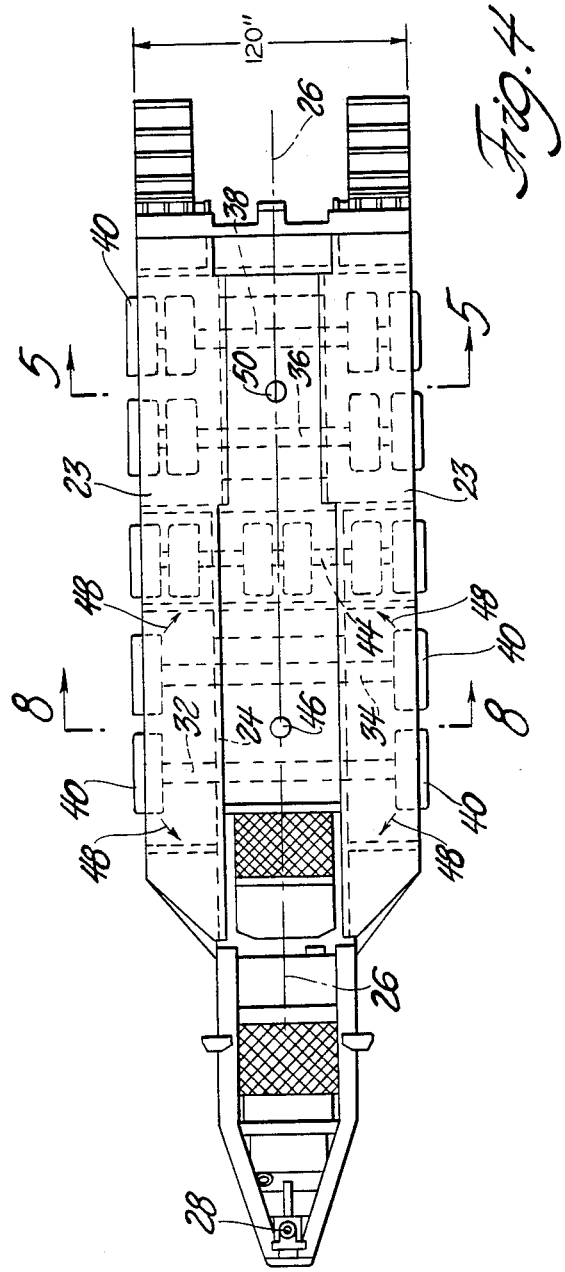
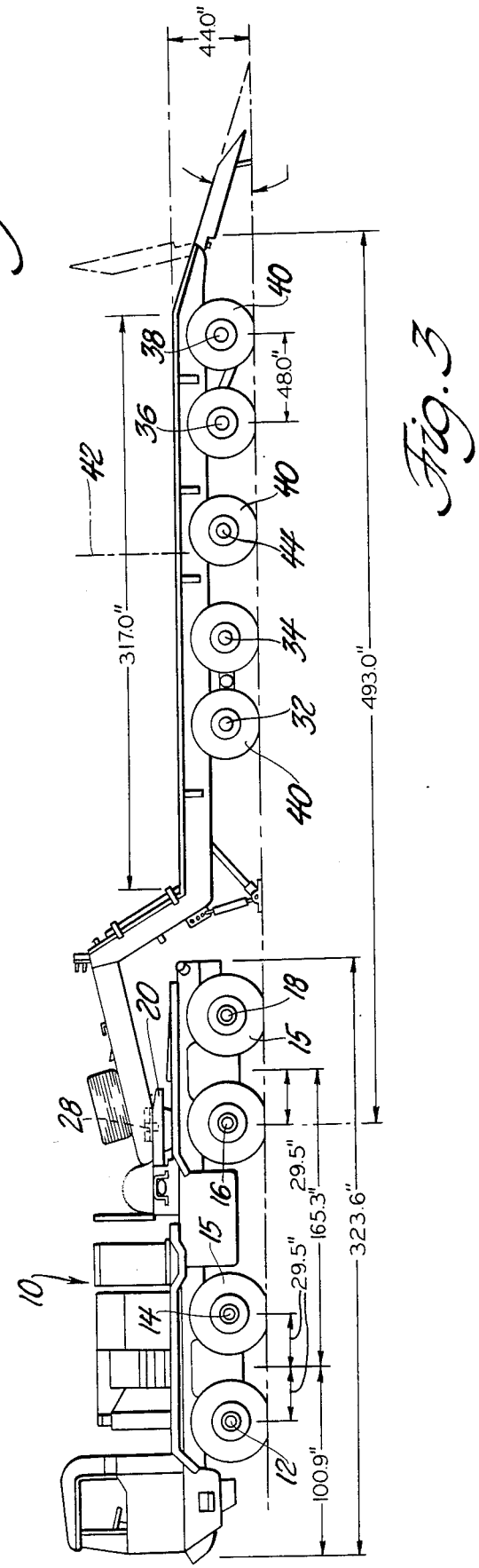

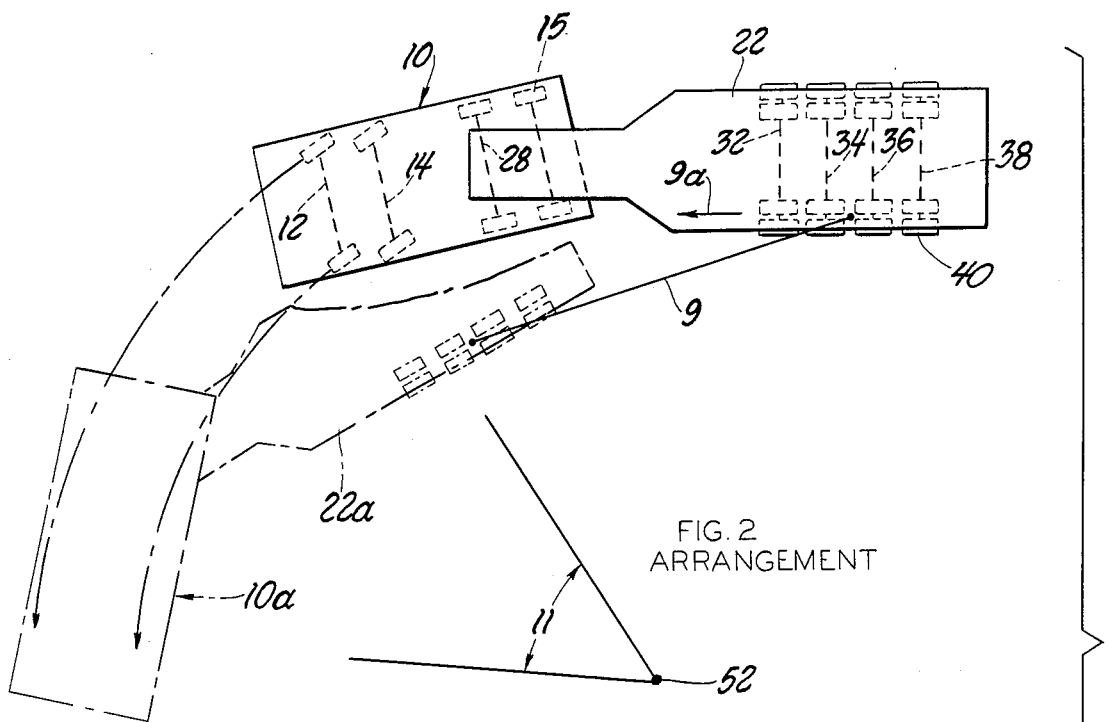
FIG. 2 ARRANGEMENT
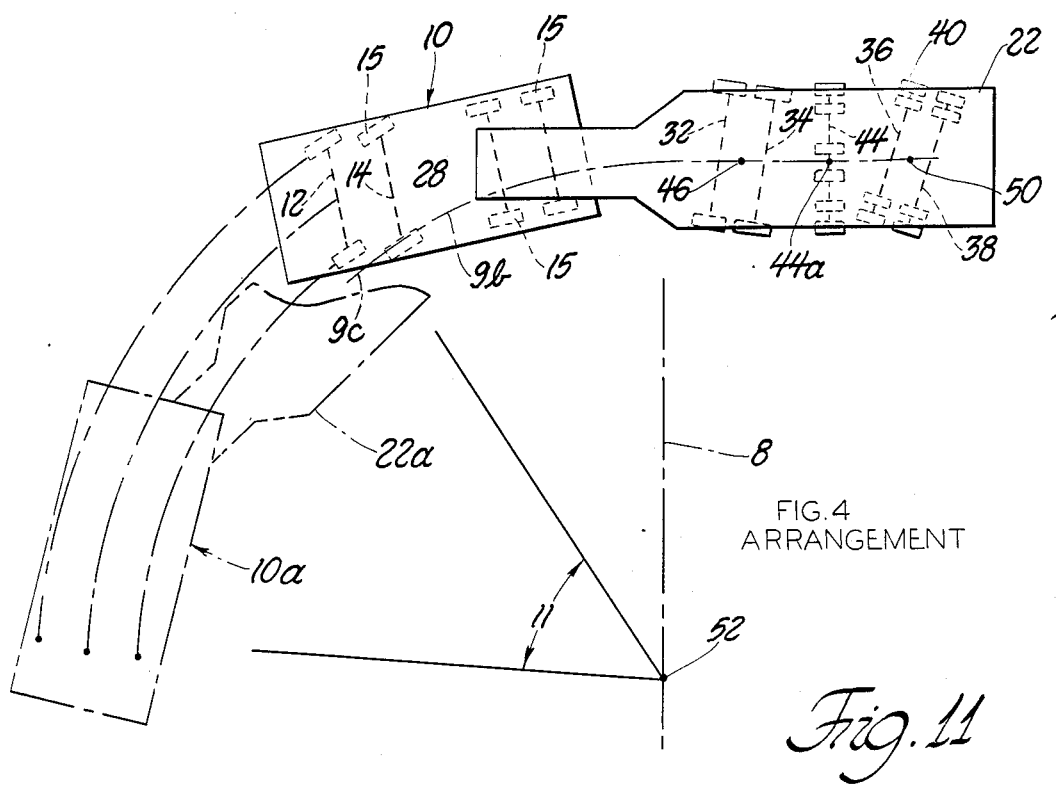
FIG. 4 ARRANGEMENT
Fig. 11

HEAVY DUTY TRAILER HAVING STEERABLE GROUND WHEELS

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to trailer improvements, especially improvements in a trailer currently used by U.S. military forces to transport bottle tanks. The Army designates the trailer as the M747 heavy equipment transporter.

A primary aim of the present invention is to provide an improved M747 trailer that will transport heavier tanks (i.e. heavier than the tanks for which it was originally designed). The improvements consist primarily in adding one new axle and at least two new ground wheels (to handle the added weight of the heavier tank). Also, new fifth wheel mechanisms are provided between the trailer bed and selected ones of the axles, whereby the axles are steerable when the tractor-trailer assembly undergoes turning maneuvers. The ground wheels (tires) can track in the direction of steer, to provide lessened skid forces between the tires and the ground surface, with resultant improvements in tire life and axle life.

THE DRAWINGS

FIG. 1 is a side elevational view of an existing tractor-trailer assembly that formed the starting basis for my invention.

FIG. 2 is a top plan view of the trailer shown in FIG. 1.

FIG. 3 and 4 are views similar to FIGS. 1 and 2, but illustrating one embodiment of my invention.

FIG. 11 is a diagram illustrating the comparative turning performance of the FIG. 2 trailer and FIG. 4 trailer.

FIGS. 1 AND 2

Figure 5:
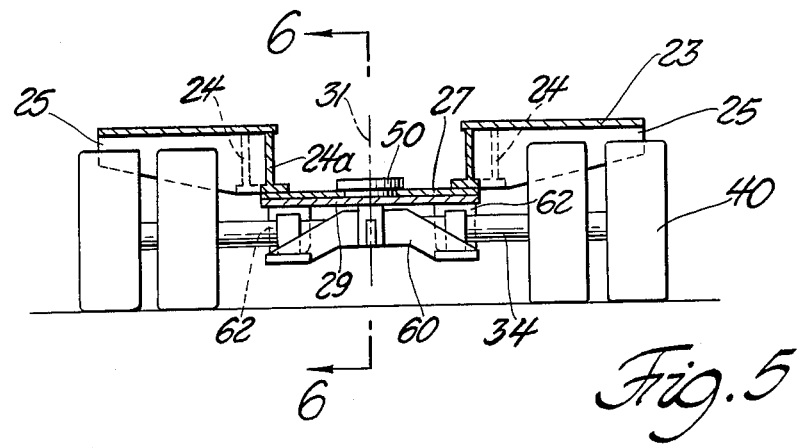
FIG. 5 is an enlarged sectional view taken on line 5—5 in FIG. 4.

Referring to FIGS. 1 and 2, there is shown a conventional tractor-trailer assembly designed to transport a military tank, designated as the M-60. The M-60 tank weighs approximately fifty two tons. The tractor shown in FIG. 1 has a U.S. Army designation M746; the trailer has a U.S. Army designation M-747.

Tractor 10 has two front axles 12 and 14, and two rear axles 16 and 18. Single wheels 15 are provided on the end of each axle. All wheels are powered. Near its rear end the tractor carries a conventional fifth wheel mechanism 20.

Trailer 22 is an elongated structure having main beams (stringers) 24 extending substantially the full length of the trailer in parallelism with the trailer centerline 26. A conventional kingpin 28 is carried on the trailer front end for swivel positionment in the aforementioned fifth wheel mechanism (carried on the tractor). An elongated deck plate 23 extends along the upper edge of each beam 24 to provide a support surface for the tank treads (not shown). The tank is loaded onto the trailer by driving it (or winching it) up the ramps 30 and onto deck plates 23. Each deck plate is reinforced against collapse by a series of transverse bulkheads 25 extending outwardly from the associated beam 24. Beams 24, bulkheads 25 and deck plates 23 form a rigid trailer bed structure for supporting the load (M-60 tank).

The general overall dimensions of the tractor and trailer are shown in the drawings, in inches. The trailer has an overall length (exclusive of ramps 30) of about 493 inches (41 feet). It has four fixed axis axles 32, 34, 36 and 38. Each end of each axle has dual ground wheels 40 thereon. The suspension for the first two axles 32 and 34 comprises two walking beams (not visible in FIG. 2). The suspension for each of the last two axles 36 and 38 comprises two trailing arms with air bags behind the axle. When the trailer is loaded (with an M-60 tank) the center of gravity lies on imaginary line 42 (midway between the two front axles 32 and 34). Each of the four axles is designed to carry approximately twelve tons.

The trailer shown in FIGS. 1 and 2 can adequately transport on M-60 tank weighing about fifty two tons. However, the U.S. military has recently been using the trailer to transport a heavier M-1 tank, that weighs in excess of sixty tons. The number of wheels and axles is not sufficient to handle the heavier loads. Tire life has been shortened. Axles have been damaged.

FIGS. 3 AND 4

FIGS. 3 and 4 show modifications I have devised in the M-747 trailer for overcoming the above deficiencies (when used to transport an M-1 tank). The modified trailer has the same overall dimensions and general construction as the predecessor trailer (FIG. 2). However the number of axles has been increased (from four to five), and the number of ground wheel has been increased (from sixteen to eighteen). Additionally certain ones of the wheels are now steerable (rather than being the fixed axis type). Use of steerable wheels will eliminate some of the tire skidding that has contributed to shortened tire life (FIG. 2 arrangement).

The trailer shown in FIGS. 3 and 4 has two front axles 32 and 34, plus two rear axles 36 and 38. There is also a new intermediate axle 44. Axles 32 and 34 are mounted in tandem relation to a fifth wheel mechanism having a pivot axis 46, such that the four associated wheels (tires) are steerable as indicated by arrows 48.

Axles 36 and 38 are mounted in tandem relation to a fifth wheel mechanism having a pivot axis 50. The axles and associated wheels are able to turn around axis 50, thereby enabling the wheels to have lessened skid motions on the ground during vehicle turning maneuvers (compared to the arrangement of FIGS. 1 and 2).

FIG. 11

FIG. 11 illustrates comparative turning performances for the two different arrangements (FIG. 2 versus FIG.

4). In each case the tractor-trailer combination is shown during a turning maneuver around an imaginary point 52 (determined arbitrarily). With the FIG. 2 arrangement, as tractor 10 moves to location 10a, through an arc 11, the trailer 22 is drawn to a position 22a. During this motion the left wheels of the trailer are drawn or dragged generally along straight line 9. The angle between line 9 and an imaginary straight-ahead line 9a represents the skid action that exists between the tires and the ground surface. With my proposed arrangement (depicted in the lower portion of FIG. 11) the skid actions are essentially eliminated.

With my proposed arrangement the six wheels on axle 44 are the predominate tractive elements that determine the direction that the trailer rear end will take during a turning maneuver. The mid point 44a on axle 44 will move along imaginary line 9b to a point 9c. Line 9b is initially a straight line that becomes arcuate when midpoint 44a passes imaginary reference line 8. The right wheels on axle 44 will move faster than the left wheels to traverse greater distances (on the outside of the turn), but there should be little or no skidding of the tires on the ground surface.

The wheels on axles 32, 34, 36 and 38 will be tractively engaged with the ground surface, such that the axle pairs (32, 34 and 36, 38) will swivel around respective pivots 46 and 50 as a reaction to the tire-ground forces. The tires will roll on the ground surface, with little or no skidding. In FIG. 11 axles 32, 34, 36 and 38 are arbitrarily shown at acute angles to the trailer centerline; this is done to show the swivel capabilities of the axle mount structures. The axles would not actually be in the FIG. 11 positions during turning maneuvers; instead the axles would float as a reaction to the tire-ground forces at the associated wheels.

FIGS. 8 THROUGH 10

Figure 8:
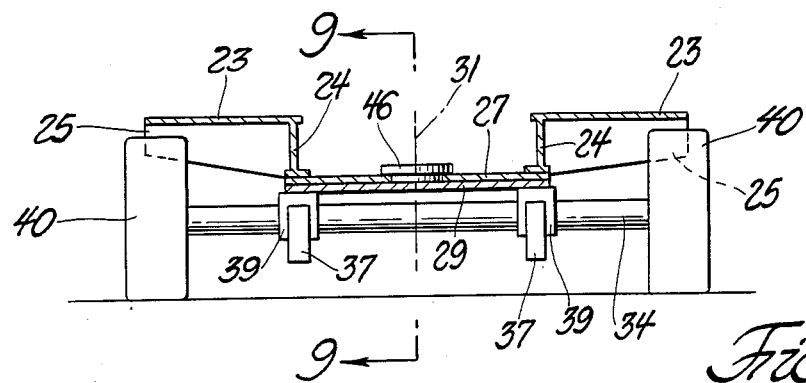
FIG. 8 is an enlarged sectional view taken on line 8—8 in FIG. 4.
Figure 9:
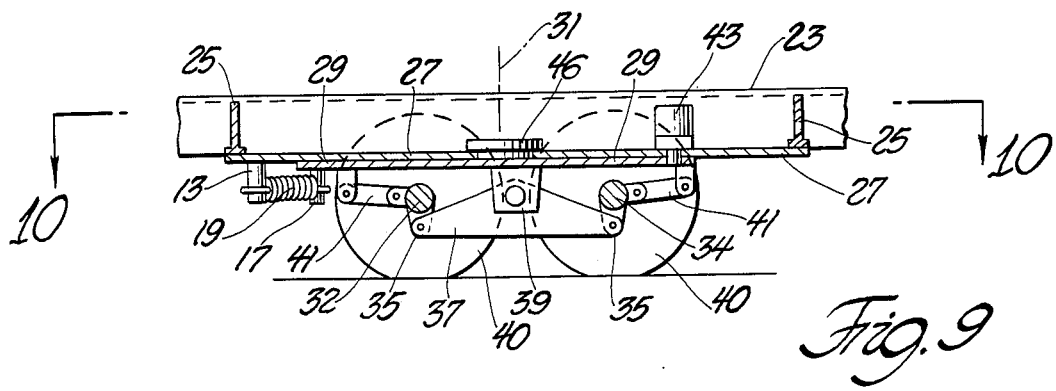
FIG. 9 is a sectional view taken on line 9—9 in FIG. 8.
Figure 10:
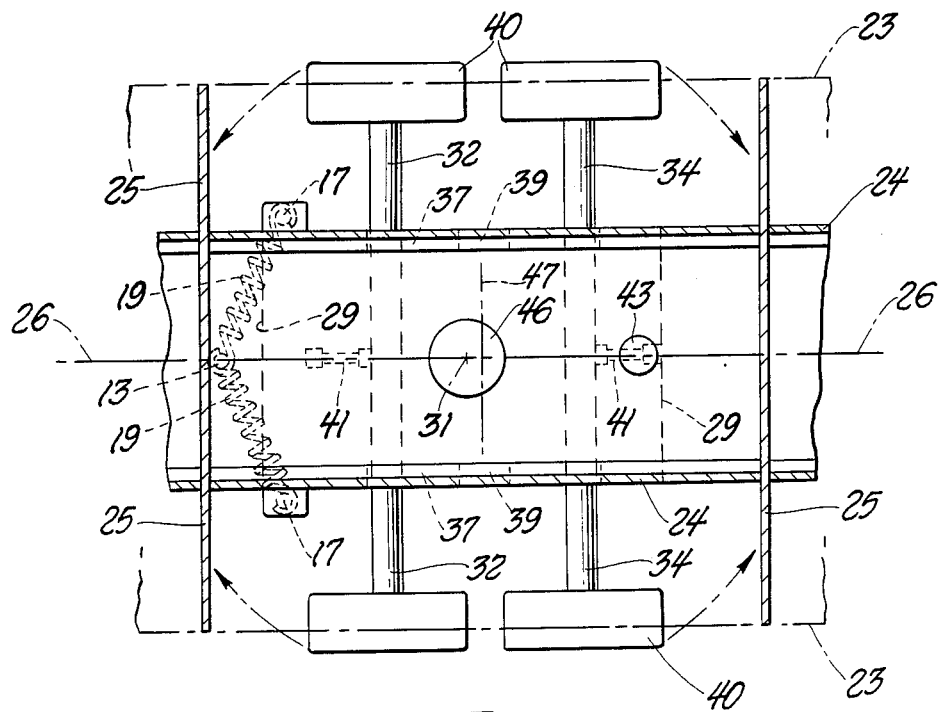
FIG. 10 is a sectional view taken on line 10—10 in FIG. 9.

FIGS. 8 through 10 illustrate some features of a fifth wheel mechanism that can be used to mount axles 32 and 34 in tandem relationship. FIG. 8 shows the aforementioned beams 24 extending downwardly from the two deck plates 23. To the existing bed structure I weld a horizontal plate 27. A second plate 29 is slidably (rotatably) arranged on the underside of plate 27 for rotation around pivot axis 31. The pivot is defined by a kingpin 46 extending from plate 29 through a circular hole in plate 27. Plate 29 forms a fifth-wheel mechanism.

The two axles 32 and 34 have link-type connections 35 with walking beams 37. Saddle members 39 extend downwardly from plate 29 to form pivotal connections with the walking beams. Torque rods 41 stabilize the axles while permitting them to move up or down under the constraint of the walking beams.

It will be noted from FIG. 10 that pivot axis 31 is located slightly forward from an imaginary plane 47 equidistant from axles 32 and 34; i.e. pivot axis 31 is slightly closer to axle 32 than to axle 34. Such a pivot location will tend to orient axles 32 and 34 into transverse attitudes (relative to centerline 26) when the vehicle is moving in a straight-ahead direction. Fishtailing or weaving tendencies are minimized.

As an optional feature, there is provided a centering means for yieldably retaining plate 29 in its straight-ahead position. Various different devices could be used to achieve the centering function. The drawings show tension coil springs 19 trained between pins 17 on plate 29 and pin 13 on plate 27. The springs are of such strength that in the absence of steer forces between the ground and the wheels (tires) the springs will maintain plate 29 (and axles 32 and 34) in the straight-ahead positions. When the towing forces are at an angle to the tire roll planes springs 19 will yield to permit the tires to track in the direction of trailer turn, as shown generally in FIG. 11.

As added insurance to achieve a straight-ahead orientation of plate 29, there is shown in FIG. 9 a fluid cylinder lock means 43 mounted on plate 27. The piston rod portion of the fluid cylinder means is adapted to enter into an opening in plate 29 when fluid pressure is applied to the uppe face of the piston. The fluid pressure comes from a remote source through a line that contains a manual valve, not shown. The valve can be located in the tractor cab for access by the driver. The valve will be operated to cause cylinder means 43 to be in its "locked" condition primarily when the tractor-trailer combination is moving in the reverse direction (to prevent jackknifing). At other times fluid cylinder means 43 is in its "unlocked" condition.

It will be noted that axles 32 and 34 are equipped with "single" wheels on their outer ends (rather than dual wheels). This is to provide clearance spaces between the tires and beam 24 during turning maneuvers. Dual wheels would unduly restrict the steering action.

FIGS. 5 THROUGH 7

Figure 6:
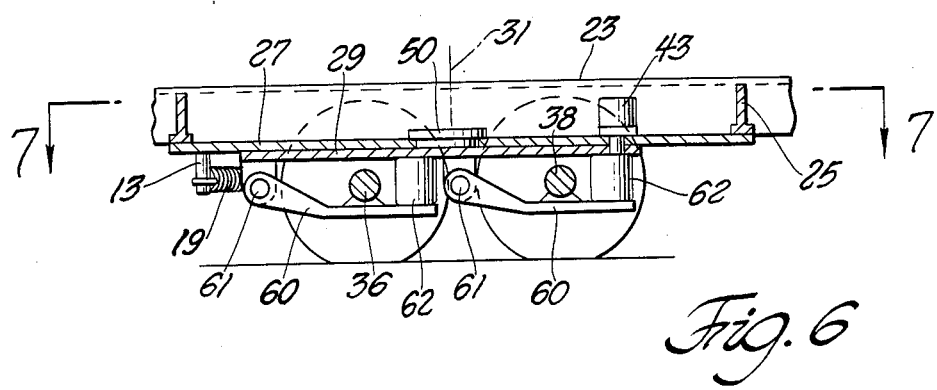
FIG. 6 is a sectional view taken on line 6—6 in FIG. 5.
Figure 7:
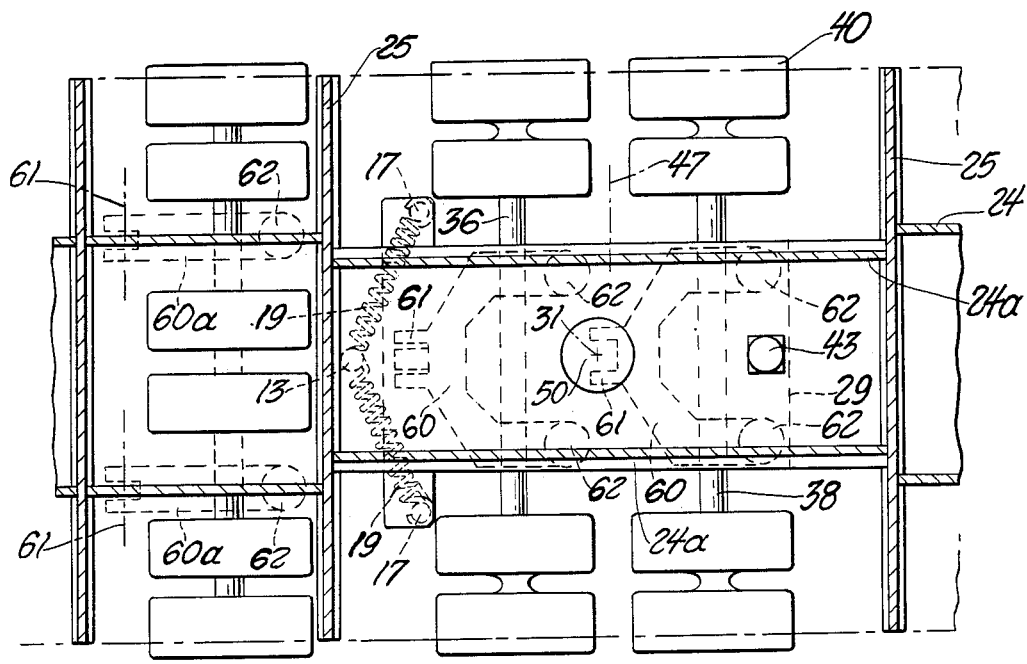
FIG. 7 is a sectional view taken on line 7—7 in FIG. 6.

FIGS. 5 through 7 illustrate some features of a fifth-wheel mechanism that can be used to mount axles 36 and 38. Sections of beams 24 are cut away, and replaced with beam sections 24a closer to trailer centerline 26 (compared to beams 24). A second plate 27 is welded to the bed structure. Rotary plate 29 is slidably engaged with plate 27 for rotation around pivot axis 31 defined by kingpin 50.

The suspension means for each axle 36 or 38 comprises a trailing arm 60 having a pivotal connection 61 with plate 29. Two air bags 62 are trained between each arm 60 and plate 29 to provide a resilient suspension force.

The dual wheel arrangement of FIGS. 5 through 7 functions generally in the same fashion as the "single" wheel arrangement of FIGS. 8 through 10. The placement of beam sections 24a inwardly from beams 24 permits the use of dual wheels while still achieving the desired "steer" action.

FIG. 7 shows some features of a trailing arm suspension system for operatively mounting the fixed axis axle 44. Two suspension arms 60a are used; an air bag 62 is trained between each arm 60a and the lower face of beam 24.

The suspension mechanisms shown in FIGS. 5 through 10 are illustrative suspension devices that can be used in practice of the invention. The invention relates primarily to the wheel-axle arrangements depicted in FIG. 4 for increasing the payload of the pre-existing trailer. The new arrangement was conceived with the aim of keeping most of the existing trailer structure intact. The basic arrangement of beams 24, kingpin 28, deck plates 23, and ramps 30 is preserved in the final arrangement. Also, the suspension components used in the FIG. 2 arrangement (prior art) are used in the final structure (FIG. 4). The suggested design lends itself to retrofit of existing M-747 hardware.

I wish it to be understood that I do not desire to be limited to the exact details of construction shown and described for obvious modifications will occur to a person skilled in the art, without departing from the spirit and scope of the appended claims.

I claim:

1. A trailer comprising an elongated bed structure defining the trailer longitudinal axis; a first vertical pivot means on the longitudinal axis near the rear end of the trailer; a first fifth-wheel mechanism rotatable in a horizontal plane around the first pivot means; first and second elongated tandem axles located below said fifth-wheel mechanism, one behind the other; a suspension means between each axle and the fifth-wheel mechanism; at least one ground wheel on each end of each axle; a third transversely-extending axle located forwardly from the first and second axles; a third suspension means between the third axle and the bed structure; dual ground wheels on each end of the third axle; a second vertical pivot means on the trailer longitudinal axis forwardly from the third axle; a second fifth-wheel mechanism rotatable in a horizontal plane around the second pivot means; fourth and fifth transversely-extending tandem axles located below said second fifth wheel mechanism, one behind the other; fourth and fifth suspension means between the fourth and fifth axles and the second fifth-wheel mechanism; at least one ground wheel on each end of the fourth and fifth axles; and a centering means between each fifth wheel mechanism and the trailer bed structure for yieldably maintaining the associated ground wheels in planes parallel to the trailer axis except when interactive forces between the ground and the wheels steer the wheels into planes acutely angled to the trailer longitudinal axis; wherein the rotational positions of the fifth wheel mechanisms are independent of one another and independent of the location of the trailer with respect to any other vehicle.

2. The trailer of claim 1 wherein the pivot axis of each vertical pivot means is located between the axles in the tandem axle set and slightly closer to the forward axle in the tandem axle set, whereby when the trailer is moving straight ahead the tandem wheels will tend to track in planes parallel to the trailer longitudinal axis.

3. The trailer of claim 2 and further comprising a fluid-cylinder lock means trained between the trailer bed structure and each fifth wheel mechanism to prevent each said fifth wheel mechanism from rotating around the associated pivot means.

4. A trailer comprising a payload-bearing bed structure defining the trailer longitudinal axis; a first vertical pivot means on the longitudinal axis near the rear end of the trailer; a first fifth-wheel mechanism rotatable in a horizontal plane around the first pivot means; a first tandem axle set comprising first and second elongated tandem axles located below the first fifth-wheel mechanism, one behind the other; a suspension means between each axle and the first fifth-wheel mechanism; at least one ground wheel on each end of the first and second axles; a third transversely-extending axle located forwardly from the first and second axles; a third suspension means between the third axle and the bed structure; dual ground wheels on each end of the third axle; a second vertical pivot means on the trailer longitudinal axis forwardly from the third axle; a second fifth-wheel mechanism rotatable in a horizontal plane around the second pivot means; a second tandem axle set comprising a fourth and fifth transversely-extending tandem axles located below said second fifth-wheel mechanism, one behind the other; a fourth suspension means between the fourth axle and the second fifth-wheel mechanism; a fifth suspension means between the fifth axle and the second fifth-wheel mechanism; at least one ground wheel on each end of the fourth and fifth axles; a centering means between each fifth wheel mechanism and the bed structure for yieldably maintaining the associated ground wheels in planes parallel to the trailer longitudinal axis except when interactive forces between the ground and the wheels steer the wheels into planes acutely angled to the trailer longitudinal axis; and a frame suppporting the bed structure and limiting the rotation of the first and second fifth-wheel mechanism in horizontal planes, the frame comprising two elongated spaced-part frame members extending parllel to the longitudinal axis of the trailer and bulkhead members extending transversely from the elongate frame members; wherein the elongate frame members and the bulkhead members extend below the plane in which lie the tops of the ground wheels so that rotation of either fifth wheel mechanism beyond a selected amount engages the ground wheels of that fifth wheel mechanism with the frame of the bed structure.

5. The trailer of claim 4 wherein each of the fifth-wheel mechanisms is steerable independently of the other.

6. The trailer of claim 5 wherein each vertical pivot means is located between the axles of the associated tandem axle set and is located slightly closer to the forward axle in the associated tandem axle set, whereby when the trailer is moving straight ahead the tandem wheels will tend to track in planes parallel to the trailer longitudinal axis.

7. The trailer of claim 6 wherein the centering means and the interactive forces between the wheels and the ground are the only means for changing the horizontal rotational position of the fifth wheel mechanisms.

8. The trailer of claim 7 wherein said centering means comprises a pair of equally strong springs for each of the fifth-wheel mechanisms, one spring biasing the associated fifth-wheel mechanism in a first angular direction and the other spring biasing the associated fifth-wheel mechanism in the opposite angular direction.

9. The trailer of claim 8 further comprising a fluid cylinder lock means trained between the trailer bed structure and each fifth-wheel mechanism to prevent each of the fifth wheel mechanisms from rotating around the associated pivot means.

10. The trailer of claim 9 and further comprising two additional ground wheels on the third axle in near adjacency to the trailer longitudinal axis.

11. The trailer of claim 10 wherein there are dual ground wheels on each end of the first and second axles.

12. The trailer of claim 11 wherein the first and second suspension means comprise trailing road arms, and air bag means between said road arms and the associated fifth wheel mechanism.

13. The trailer of claim 12 wherein the fourth and fifth suspension means comprise walking beam structures rockable around a transverse axis located midway between the fourth and fifth axles.

* * * * *